United States Patent Office 3,437,811
Patented Apr. 8, 1969

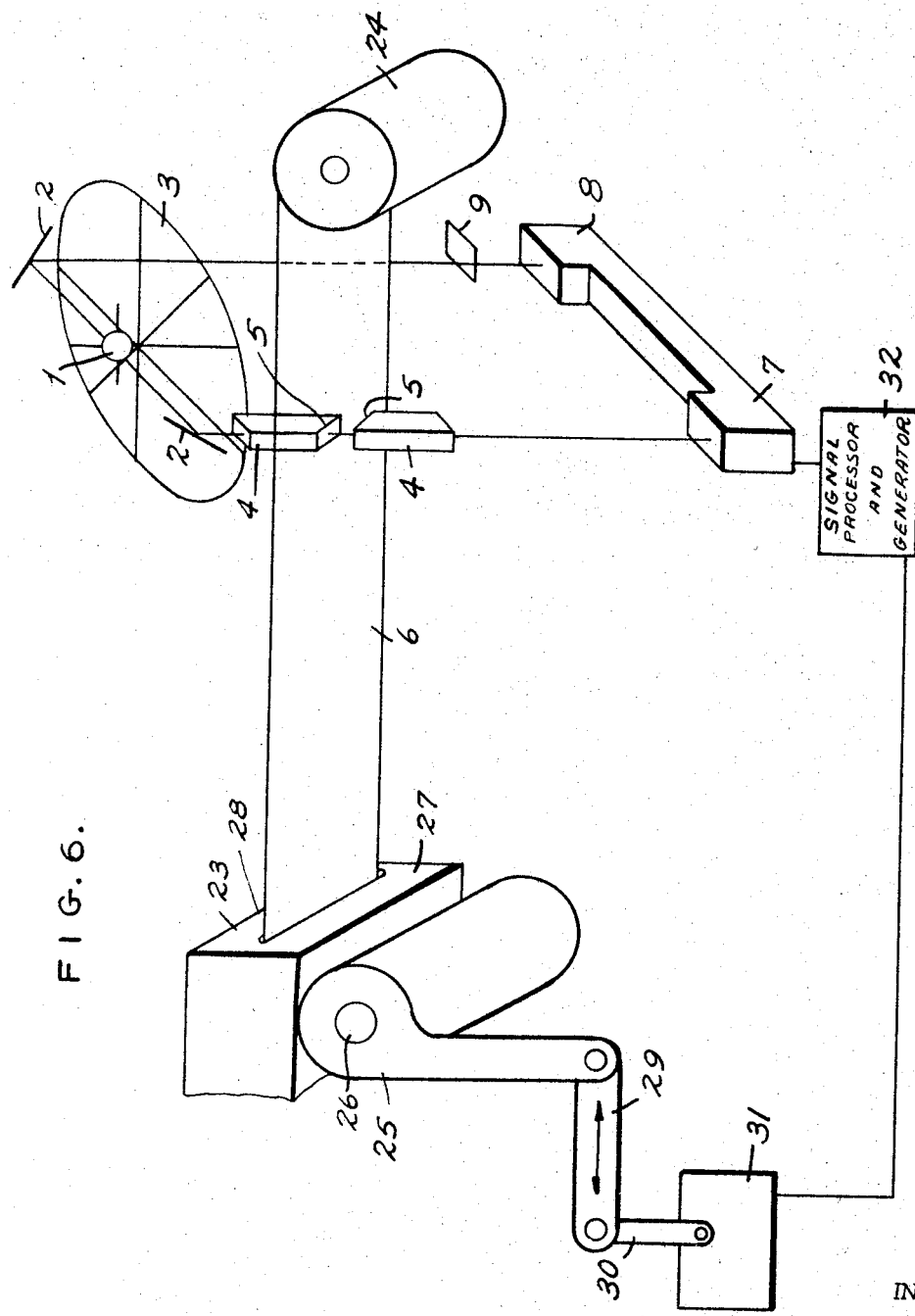

3,437,811
METHOD AND APPARATUS FOR MEASURING THE THICKNESS OF A FILM
Harry Arthur Willis and William Allan Boyes, Welwyn Garden City, England, assignors to Imperial Chemical Industries Limited, Millbank, London, England, a corporation of Great Britain
Filed Apr. 14, 1967, Ser. No. 630,937
Claims priority, application Great Britain, May 4, 1966, 19,754/66
Int. Cl. G01t 1/16
U.S. Cl. 250—83.3   18 Claims

ABSTRACT OF THE DISCLOSURE

Measuring the thickness of film by infra-red absorption in which infra-red radiation is passed through the film and (a) the angle of incidence is such that any doubly internally reflected radiation is polarised in the plane of incidence and (b) a polariser is placed in the beam before or after the film so that it removes (or would remove) the polarised light.

---

This invention relates to a method and apparatus for measuring thickness of films by the measurement of infra-red radiation absorbed by the film. In particular it relates to the measurement of thickness of films of thermoplastic materials.

Thermoplastic films are often very thin and we have found that, in developing a method of measuring the thickness of the films by means of absorption of infra-red radiation, since their thickness is often of a similar order of magnitude to the wavelength of the radiation, and since they have two planar, substantially parallel faces it is difficult to get accurate results because of "interference fringes" which arise from a double internal reflection of some of the radiation which may reinforce or attenuate the signal received by the sensing means. It is an object of the present invention to overcome this difficulty.

Since films and in particular plastic films absorb radiation strongly over limited wavelengths which are characteristic of the chemical nature of the material from which the film is made, it is a further object of this invention to provide a measuring method and instrument which is particularly sensitive to these wavelengths.

Accordingly, we provide a method of measuring the thickness of a film, the thickness of which is of a similar order of magnitude to the wavelength of the infra-red radiation used in the measurement, in which a beam of the infra-red radiation is passed through said film to means for measuring the radiation absorbed by the film in which (a) the beam makes an angle with the planar substantially parallel faces of the film such that any transmitted radiation arising from double internal reflection is polarised in the plane of incidence and (b) the beam also passes through a polarising means so positioned that light polarised in the said plane of incidence is removed from the beam. The beam may be passed through the polarising means before and/or after it passes through the film.

We have found the present invention to be particularly useful when the film is of a thermoplastic material. The film may comprise a single layer and be made from a single polymer or it may be made from a copolymer of one or more monomers. We also include films which comprise two or more layers e.g. laminates or films bearing a surface coating of a different thermoplastic material. Examples of such thermoplastic films are those made from polyethylene (high or low density), polypropylene and other polymerisable polyolefines, polyesters e.g. polyethylene terephthalate, polyamides, oxymethylene polymers and copolymers, polymers and copolymers of vinylidene chloride e.g. vinylidene chloride/acrylonitrile copolymers, polymers and copolymers of vinyl acetate, e.g. ethylene/vinyl acetate copolymers, polysulphones and poly-3-bis chloromethyl oxy-cyclobutene.

The beam of radiation may be passed from a source through the film to a measuring means placed on the opposite side of the film or, alternatively, it may be passed once through the film, reflected by a suitable reflecting means and passed a second time through the film to a measuring means on the same side of the film as the source.

The film to be measured may be held stationary during the measurement but the method and apparatus are particularly useful for measuring the thickness of film when it is moving, e.g. immediately after it is made. The measuring beam may also be traversed across the film by moving the source, sensing device and polariser with respect to the film or vice versa.

By a similar order of magnitude we mean from 0.01 to 100 times the wavelength of the radiation used. For example, we are particularly concerned with the measurement of films and film coatings whose thicknesses range from $3.10^{-7}$ inches to $0.05''$, preferably from $10^{-5}$ inches to $0.05''$. It has long been known that the nature of electromagnetic radiation (e.g. light) which is reflected from a surface (e.g. the surface of a film) is dependent on the angle $\alpha$ between the incident radiation and the normal to the reflecting surface and that when the tangent of this angle is equal to the ratio of the refractive index of the film to the refractive index of the medium outside or surrounding the film, this reflected radiation is completely plane polarised. We have now applied this theory to the measurement of radiation transmitted by a film and the interfering radiation which we wish to eliminate is doubly internally reflected. In the case of internal reflection the tangent of the angle $\alpha$, referred to above, is equal to the ratio of the refractive index of the surrounding medium to the refractive index of the film. It is well known that plane polarised radiation can be eliminated from a beam of radiation by passing that beam through a polarising cell of known construction. The present method according to our invention, therefore, provides a means of removing the interfering, doubly internally reflected radiation.

It is immaterial whether the polariser is placed before or after the film since if the polariser is placed before the film, radiation polarised in the plane of incidence (or that component of the radiation whose electro-magnetic vibration occurs in the plane of incidence), which radiation would have been doubly internally reflected by the film, is removed from the beam and if the polariser is placed after the film the doubly internally reflected radiation is removed from the beam.

Any known method may be used for measuring the transmitted radiation but we have found that the sensitivity of this measurement may be increased by periodically interrupting the beam by a filter means which absorbs substantially all the wavelengths of radiation which correspond to the strong absorption wavelengths of the film while allowing substantially all the remainder of the radiation to pass through. The sensing instrument then has to detect the difference between the filtered and unfiltered radiation which difference is due substantially entirely to absorption by the film of the said wavelengths of strong absorption.

In certain cases where the absorption of the film is relatively weak, it is necessary to introduce a further modification to our method in order to distinguish the attenuation in the energy of the beam due to the absorption of the film, which is of course the quantity it is desired to measure, from attenuation in the energy of the beam due to scattering at the surface of the film. Since the former attenuation occurs only at the wavelength at which the film absorbs whereas the latter attenuation is not selective and occurs over a wide range of wavelengths, it is possible to distinguish the two types of attenuation. The way in which we have done this is by using a second filter in conjunction with the filter mentioned above and interposing these filters alternately into the beam. The second filter is such that, while transparent to the strong absorption wavelengths of the film, it absorbs at wavelengths adjacent thereto. The sensing instrument then becomes sensitive to differences in absorption at the wavelengths of strong absorption of the film and absorption at adjacent wavelengths and the effect of this is that any true absorption by the film will be shown up by the sensing instrument but any apparent absorption which is in fact due to scattering and which will occur equally at wavelengths of strong film absorption and adjacent wavelengths will not be shown by the sensing instrument.

The absorption of the film as measured by the sensing means is, for a given polymer or for a given concentration of one copolymerised monomer in a copolymer, related to the thickness of the film. It is within the scope of this invention to use the signal obtained from the sensing means as a feedback to a previous stage in the manufacture of the film e.g. to the extrusion or coating apparatus in order to maintain the thickness being measured at a predetermined value.

Our invention also comprises an apparatus for carrying out the method of our invention comprising a source of infra-red radiation, a polarising device and a means for measuring transmitted radiation, said source, polariser and measuring means being arranged so that a beam of radiation emitted from the source passes through the polariser to the sensing apparatus and means for interposing said film in such a way that the beam makes an angle with the planar substantially parallel faces of said film such that any transmitted radiation arising from double internal reflection would be polarised in the plane of incidence, the polariser being so positioned that light polarised in the plane of incidence is removed from the beam.

In the preferred case where we used infra-red radiation from any suitable source, such radiation may be used with or without a reflector to reinforce the beam.

As mentioned above the polariser may be of any standard type e.g. a transmission polariser comprising two or more thin films of selenium or of silver chloride or, especially in the case where the beam is reflected so that it passes twice through said body, a reflection polariser in the form of a selenium mirror.

The sensing device in the case of infra-red radiation is preferably made sensitive to the relatively narrow range of wavelengths at which the film being measured preferentially absorbs the infra-red radiation. An example of such a measuring instrument is one which has a "Luft" detector containing a gas having one or more absorption bands in its infra-red spectrum which coincide with at least one strong absorption band of the film. Such a measuring instrument may conveniently be a single beam instrument in which one half of the "Luft" detector is covered over while a measuring beam containing the transmitted radiation from the film is admitted through a transparent window to the other half of the "Luft" detector. The gas chambers comprising each half of the detector are separated by a pressure sensitive metal diaphragm close to which and parallel to it is situated a metal grid and the gas in both chambers has an infra-red absorption spectrum with a band or bands in accordance with at least one strong absorption band of the said film. Because the measuring beam contains transmitted radiation from the film whereas the other half of the cell receives no such radiation, the gas of the measuring side is heated more than the gas of the other side and the resulting pressure change causes a deflection of the diaphragm between the two chambers and the amount of transmitted energy in the measurement beam can thus be ascertained from the deflection of this diaphragm. The measuring beam contains transmitted radiation from the film which heats the gas in the measuring side of the "Luft" detector. The resulting pressure change causes a deflection of the diaphragm altering the capacitance between the diaphragm and grid. There is a connecting hole between the two halves of the detector which allows the pressures to equalise slowly and, in general, the measuring beam is modulated by periodically inserting a filter in the beam. The gas in the measuring side of the detector will then be heated periodically and the resulting capacitance change between the diaphragm and grid will be in phase with the insertion of the filter.

Alternatively, such an instrument may be used as a double beam instrument, for instance using an optical wedge in the reference beam and a standard temperature comparison source in a reference beam, the wedge being moved until the detector shows no difference in intensity between the energies in the beams at the desired wavelengths. The advantage of using such an instrument is that, as in the case of double beam infra-red spectrophotometers, drift is avoided.

It is preferred to use in conjunction with our apparatus a filter which absorbs radiation at the same wavelength as that of the said film and preferably this filter is made of the same material as said film. In operation this filter is intermittently inserted across the beam of radiation. A suitable form of filter is in the form of a rotating circular disc divided into a number of segments, so that segments comprising a filter of the type mentioned alternate with blank spaces. Because as mentioned above a small amount of radiation of all wavelengths is scattered at the surface of the film and this radiation is attenuated in addition to radiation of the required wavelengths, in an arrangement which is preferred when the absorption of the film is weak, segments comprising a material which does not absorb at the same wavelength as the film but at adjacent wavelengths alternate with segments containing the filter which does absorb at the same wavelengths as the said film. In the case of a laminate it is preferred that this material which does not absorb at the same wavelength as, but at adjacent wavelengths to, the component of the laminate to be measured should, if possible, consist of a chosen material of the laminate other than that which is to be measured. This reduces the sensitivity of the apparatus to variations in thickness of this chosen material.

For example, in measuring a film of ethylene/vinyl acetate copolymer or a laminate comprising such a film or a film coated with ethylene/vinyl acetate copolymer it is preferred to use a disc having four equal segments in which two opposed segments are of polyethylene and the other two opposed segments are of ethylene/vinyl acetate copolymer, the amount of ethylene in each of the latter segments being equal to the total amount of polyethylene in the case of each of the other segments. Where it is necessary to obtain a measure of the absorption due to each of two or more films comprising a laminate or a coated film it is possible to design a rotating filter having a number of equal segments equal to the number of measurements to be made plus a blank segment or to have a multiple thereof. Since in this latter case it is normally necessary to have a separate detector for each component to be measured and it is thus necessary to provide a switching arrangement to bring the particular detector into play synchronously with the rotation of the disc, we prefer to use the simple arrangement in which one rotating filter and sensing means is used for each component to be measured since it is generally more economical and convenient to do this, especially since the same amplifying and amplified signal recording mechanism may be used for the plurality of detectors.

The invention is illustrated but in no way limited by the accompanying drawings in which FIGURE 1 is a diagrammatic illustration of the thickness measuring apparatus, FIGURE 2 is a detailed illustration of a filter disc, FIGURE 3 shows spectra obtained with and without the use of a polariser, FIGURE 4 illustrates the effect of using two filters alternately.

FIGURE 6 is a schematic perspective view showing the use of a device embodying the invention and in a "feedback" system.

Figure 1:
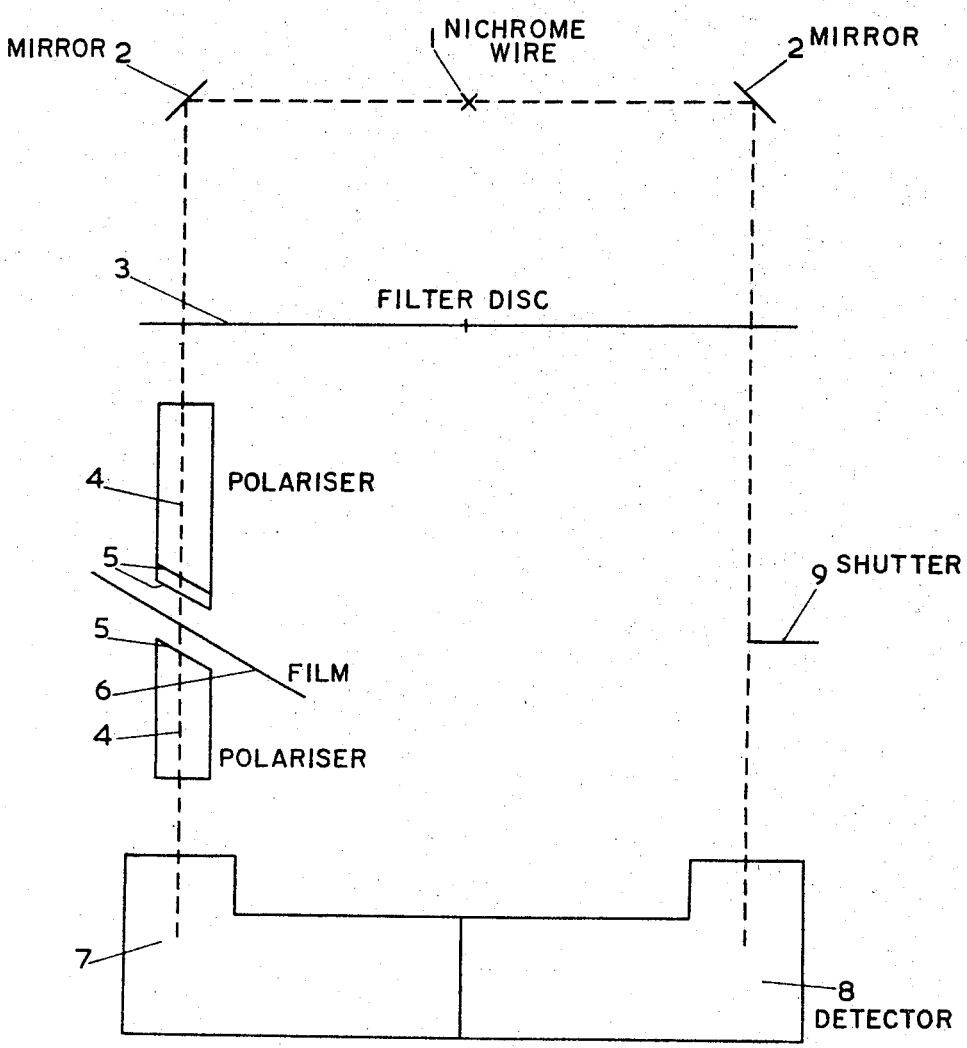

In FIGURE 1 a Nichrome wire 1 serves as a source of infrared radiation which is reflected by mirrors 2 through a rotating filter disc 3. The left hand beam as shown in FIGURE 1 is then passed through a polariser 4 which comprises three films of silver chloride 5, two of which are placed above the film 6 the thickness of which is being measured and one of which is placed below the film. The beam then passes to the measuring cell of a "Luft" detector. The right hand beam after passing through the filter disc goes to the reference side 8 of the "Luft" detector. A shutter 9 is provided so that the proportion of this beam reaching the detector can be varied.

Figure 2:
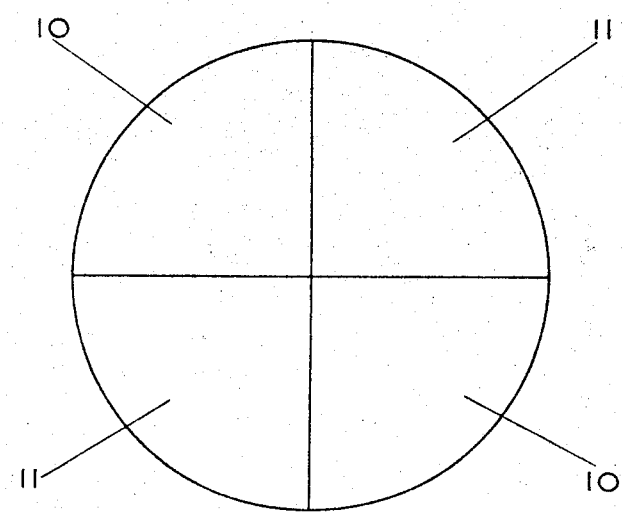

FIGURE 2 shows a filter disc such as that denoted 3 in FIGURE 1 which has four quadrants. Quadrants 10 are of polyethylene film and quadrants 11 are of an ethylene/vinyl acetate copolymer, the amount of polymerised ethylene in quadrants 11 being equal to the amount of polyethylene in quadrants 10.

Figure 3:
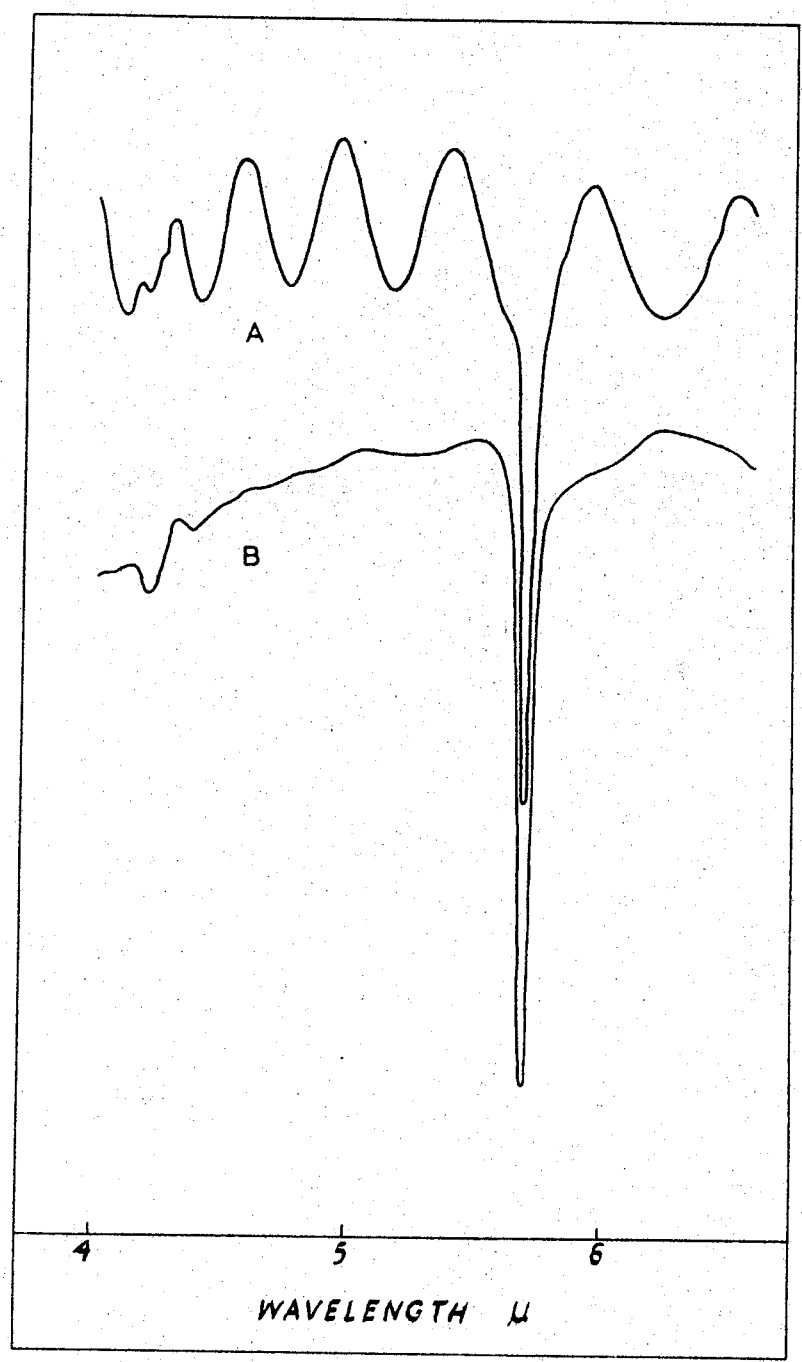

FIGURE 3 shows the infra-red spectrum obtained from a thickness measuring device with and without the provision of the polariser. Curve A is the spectrum which is obtained without using a polariser in which the large variations 12 are due to the interference arising from double internal reflection and curve B is that obtained using a polariser and operating the process under the conditions of the present invention in which it can be seen that no such interference is present.

Figure 4:
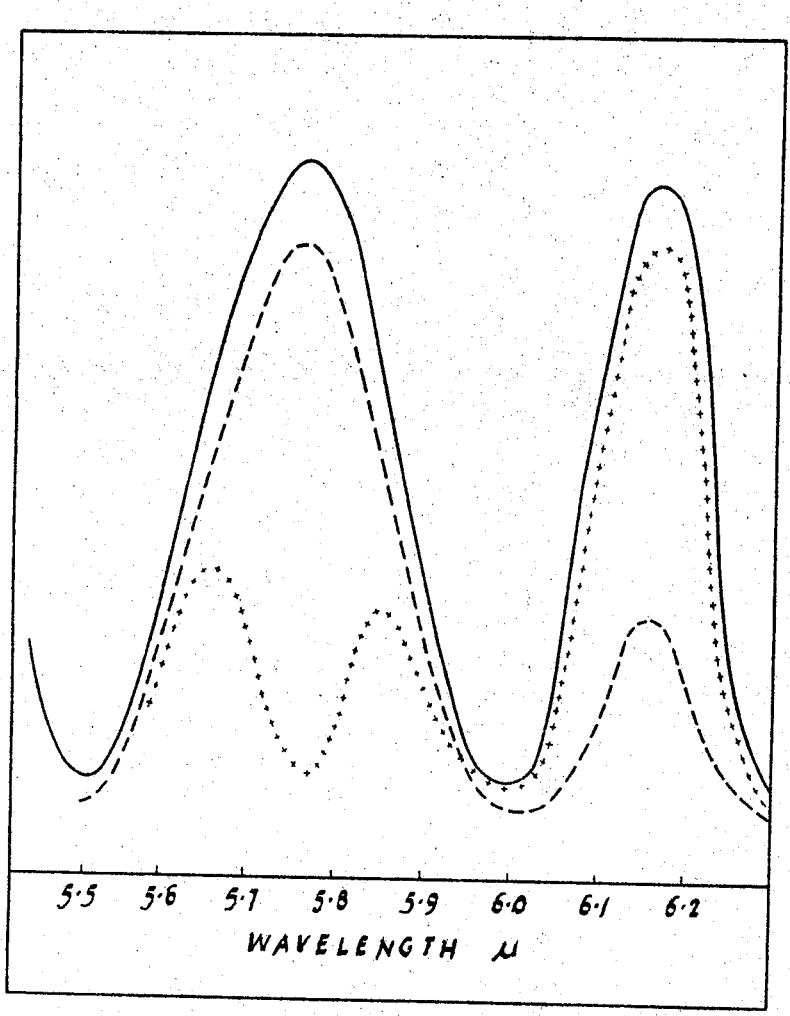

FIGURE 4 illustrates the effect on the sensitivity of the "Luft" detector of using two filters alternately in the beam to eliminate variation due to scatter. The full line curve in FIGURE 4 represents the sensitivity of a "Luft" detector which uses as detector gas vinylidene fluoride and it can been seen that this has peaks at wavelengths of 5.7 and 6.2 microns. When a first filter comprising a film of a copolymer of ethylene and ethyl acrylate which absorbs strongly at 5.7 microns but only to a negligible extent at 6.2 microns is used, the effect on the sensitivity curve of the detector is shown by the curve composed of crosses. When a second filter is introduced comprising nylon 66 film, the effect is shown by the broken line curve. When both filters are introduced alternately, e.g. by making up a disc as in FIGURE 2 having quadrants 10 of the copolymer film and quadrants 11 of nylon 66 film and rotating this in the beam, the effect is that if attenuation in the beam occurs equally at 5.7 and 6.2 microns there will be no output signal from the detector, but if the attenuation occurs at one of these wavelengths only, then there will be a resultant signal. For example, if this system is used in measuring the thickness of polyethyl acrylate film which absorbs strongly at 5.7 microns but not at 6.2 microns, then any attenuation due to this absorption will show up in the detector since the peak at 5.7 microns will be reduced but not the peak at 6.2 microns, but any attenuation due to scattering which will occur equally at 5.7 microns and 6.2 microns will affect both peaks equally and no resultant signal will be produced due to the scattering.

Figure 5:
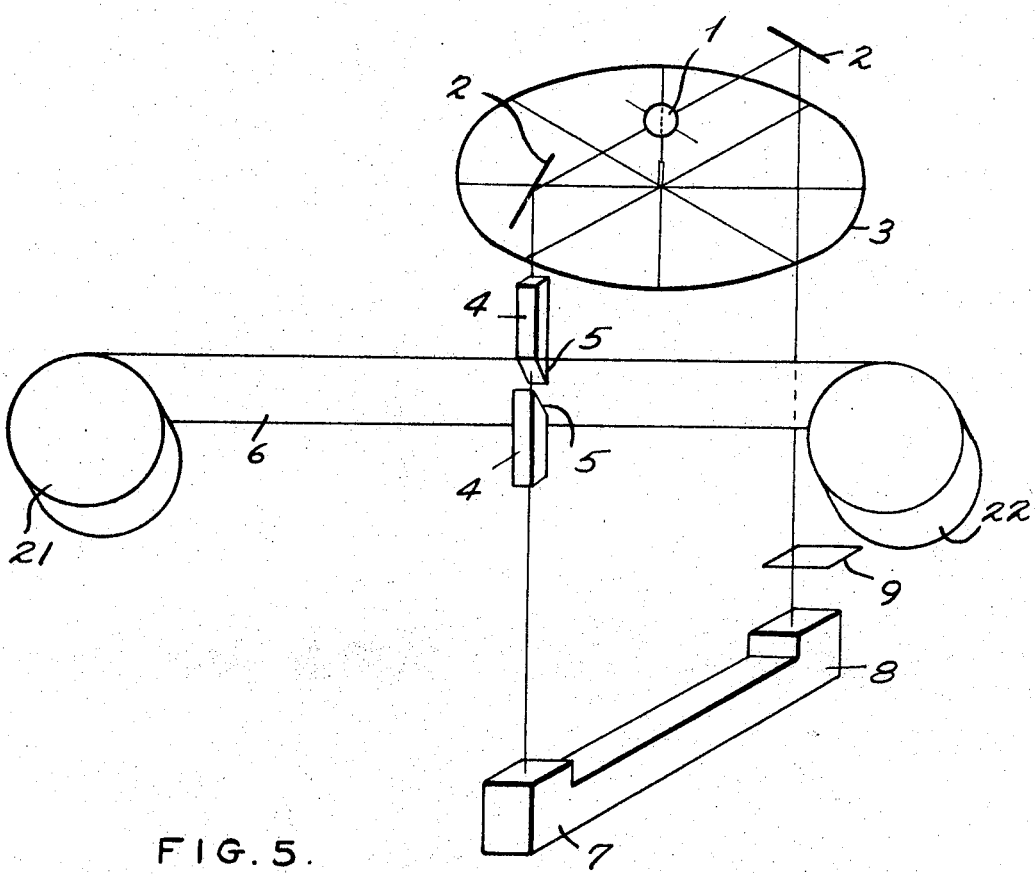
FIGURE 5 is a schematic perspective view of the application of the invention to the measurement of the thickness of a moving film.

FIGURE 5 is a schematic perspective view of the application of the invention to the measurement of the thickness of a moving film. Reference numerals 1 to 9 have the same significance as in FIGURE 1, 21 refers to a supply reel for the film 6 and 22 refers to a reel on which the film is collected.

FIGURE 6 is a schematic perspective view showing the use of a device embodying the invention and in a "feedback" system. In this figure, where reference numerals 1 to 9 again have the same significance as in FIGURE 1, the film 6 is formed by melt extrusion from a die 23. After being chilled by means not here illustrated, the extruded film is passed through the measuring beam of a thickness gauge and then rolled up on reel 24. A cam 25, pivoted at 26 acts against the lower lip 27 of the die, the upper lip 28 being rigidly fixed. The die gap can thus be varied. Cam 25 is actuated through connecting rod 29 by a moving arm 30 which is driven by an electric motor 31. The power supply to motor 31 is controlled by the signal processor generator 32 which is in turn commanded by the response from the "Luft" cell. If the response from the "Luft" cell indicates that the film, as it passes through the measuring beam, is thicker than a predetermined value the signal processor and generator will actuate the motor 31 in such a way that, through connecting rod 29 and cam 25, the die gap is decreased and similarly, an indication that the film is too thin will lead to an increase in the die gap.

Example

Using the apparatus illustrated in the accompanying FIGURE 1 and filter disc shown in FIGURE 2, the thickness of an ethylene/vinyl acetate copolymer coating containing about 20% by weight of vinyl acetate on a polypropylene film of 0.006 inch thickness was measured. The thickness of the films used in the chopper was 0.004 inch. Using this apparatus, thickness measurements accurate to plus or minus 5% were made of such coatings which were of thicknesses ranging from 5 to 15 gauge.

We claim:

1. A method for measuring the thickness of a film, the thickness of which is of a similar order of magnitude to the wavelength of the infra-red radiation used in the measurement, in which a beam of the infra-red radiation is passed through said film to means for measuring the radiation absorbed by the film in which (a) the beam makes an angle with the planar substantially parallel faces of the film such that any transmitted radiation arising from double internal reflection is polarised in the plane of incidence and (b) the beam also passes through a polarising means so positioned that light polarised in the said plane of incidence is removed from the beam.

2. A method according to claim 1 in which said beam is passed through the polarising means after it has passed through the film.

3. A method according to claim 1 in which said beam emanates from a source which is positioned on the opposite side of said film to said measuring means.

4. A method according to claim 1 in which a film of thermoplastic material is used.

5. A method according to claim 1 in which said film is a laminate comprising a plurality of layers.

6. A method according to claim 1 in which said film is moving.

7. A method according to claim 1 in which said measuring beam and the film are traversed with respect to one another.

8. A method according to claim 1 in which, after it has passed through the film and before it reaches the measuring means, the beam is periodically interrupted by a filter means which absorbs substantially all the wavelengths of radiation which correspond to the strong absorption wavelengths of the film while allowing substantially all the remainder of the radiation to pass through.

9. A method according to claim 1 in which, after it has passed through the film and before it reaches the measuring means, the beam is alternately periodically interrupted by a first filter means which absorbs substantially all the wavelengths of radiation which correspond to the strong absorption wavelengths of the film while allowing substantially all the remainder of the radiation to pass through and by a second filter means which absorbs at wavelengths of radiation adjacent to substantially all the strong absorption wavelengths of the film while allowing substantially all the remainder of the radiation to pass through.

10. A method for the production of a thermoplastic film of improved thickness profile in which said film is extruded from a film die, said die being provided with adjusting means whereby the profile of the extruded film can be controlled, the thickness of the film is then measured by the method according to claim 1 and a signal obtained from said means for measuring the radiation absorbed by the film is converted to suitable form to cause said adjusting means to maintain said profile at a desired value.

11. An apparatus for measuring the thickness of a film comprising a source of infra-red radiation, a polarising device and a means for measuring transmitted radiation, said source, polariser and measuring means being arranged so that a beam of radiation emitted from the source passes through the polariser to the sensing apparatus and means for interposing said film in such a way that the beam makes an angle with the planar substantially parallel faces of said film such that any transmitted radiation arising from double internal reflection would be polarised in the plane of incidence, the polariser being so positioned that light polarised in the plane of incidence is removed from the beam.

12. An apparatus according to claim 11 in which said sensing means comprises a "Luft" detector.

13. An apparatus according to claim 11 which incorporates a filter which absorbs radiation at the same wavelengths as those at which the said film strongly absorbs, and means periodically to interrupt the beam with said filter.

14. An apparatus according to claim 13 in which said filter comprises the same material as the said film.

15. An apparatus according to claim 13 in which said filter comprises one or more discrete segments of a rotatable disc.

16. An apparatus according to claim 13 which incorporates a second filter which absorbs radiation at wavelengths adjacent to those wavelengths at which the said film strongly absorbs but is transparent to those wavelengths at which the film strongly absorbs and means periodically to interrupt the beam with the second filter alternately with the filter according to claim 13.

17. An apparatus according to claim 16 in which said second filter comprises one or more discrete segments of a rotatable disc.

18. An apparatus according to claim 17 in which said second filter and said filter according to claim 13 form alternate segments of a rotatable disc.

References Cited

UNITED STATES PATENTS

| | | |
|---|---|---|
| 2,393,631 | 1/1946 | Harrison et al. ____ 250—83.3 X |
| 2,726,173 | 12/1955 | Martin. |
| 3,017,512 | 1/1962 | Wolbert. |

RALPH G. NILSON, *Primary Examiner.*

A. B. CROFT, *Assistant Examiner.*

U.S. Cl. X.R.

250—43.5